(12) United States Patent
Usagawa et al.

(10) Patent No.: US 10,439,527 B2
(45) Date of Patent: Oct. 8, 2019

(54) MOTOR CONTROL DEVICE

(71) Applicant: Rohm Co., Ltd., Kyoto (JP)

(72) Inventors: Naoyuki Usagawa, Kyoto (JP); Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/611,984

(22) Filed: Jun. 2, 2017

(65) Prior Publication Data
US 2017/0353131 A1 Dec. 7, 2017

(30) Foreign Application Priority Data

Jun. 6, 2016 (JP) .................................. 2016-112650

(51) Int. Cl.
*H02P 6/182* (2016.01)
*H02P 23/00* (2016.01)
*H02P 27/08* (2006.01)

(52) U.S. Cl.
CPC .......... *H02P 6/182* (2013.01); *H02P 23/0004* (2013.01); *H02P 27/08* (2013.01)

(58) Field of Classification Search
CPC ....... H02P 6/182; H02P 23/0004; H02P 27/08
USPC .................................................... 318/400.35
See application file for complete search history.

(56) References Cited

U.S. PATENT DOCUMENTS

| | | | | |
|---|---|---|---|---|
| 5,969,491 A * | 10/1999 | Viti | ......................... | H02P 6/182 318/400.13 |
| 6,329,785 B1 * | 12/2001 | Starkie | ..................... | H02P 25/04 318/441 |
| 6,420,847 B1 * | 7/2002 | Galbiati | ................... | H02P 6/182 318/400.33 |
| 7,138,776 B1 * | 11/2006 | Gauthier | ................... | H02P 6/10 318/400.34 |
| 8,614,556 B1 * | 12/2013 | Ito | ............................ | H02P 6/10 318/400.04 |
| 8,982,501 B1 * | 3/2015 | Nicholls | ................ | G11B 19/28 360/73.03 |
| 9,559,622 B2 * | 1/2017 | Fujimura | .................. | H02P 6/18 |
| 2003/0048083 A1 * | 3/2003 | Tieu | ....................... | G11B 19/28 318/400.09 |

(Continued)

FOREIGN PATENT DOCUMENTS

JP 2014-087210 5/2014

*Primary Examiner* — Kawing Chan
(74) *Attorney, Agent, or Firm* — Fish & Richardson P.C.

(57) ABSTRACT

A motor control device includes an energization controller that generates energization control signals of a bridge driver, an ADC that samples and converts analog feedback voltages corresponding to output voltages of the bridge driver into digital feedback signals, and a zero-crossing detector that receives the feedback signals so as to perform zero-crossing detection for determining commutation timing and PWM duty of the energization control signal. Sampling timings of the ADC are switched to one of PWM on period and PWM off period according to the PWM duty. The energization controller PWM drives lower side switches of the bridge driver, and the sampling timings of the ADC are set to the PWM off period. The ADC performs an ADC process of the feedback voltage both in the PWM on period and in the PWM off period, and the zero-crossing detector adopts one of ADC results according to the PWM duty.

17 Claims, 20 Drawing Sheets

(56) References Cited

U.S. PATENT DOCUMENTS

| | | | | |
|---|---|---|---|---|
| 2003/0094917 | A1* | 5/2003 | Garrigan | B60L 11/02 318/700 |
| 2005/0113981 | A1* | 5/2005 | Zafarana | H02M 3/1584 700/297 |
| 2006/0066280 | A1* | 3/2006 | Bhaumik | H02P 6/185 318/599 |
| 2007/0210732 | A1* | 9/2007 | Bosch | H02P 6/182 318/400.11 |
| 2008/0067960 | A1* | 3/2008 | Maeda | B62D 5/046 318/400.02 |
| 2008/0238349 | A1* | 10/2008 | Cheng | H02P 6/16 318/400.05 |
| 2012/0256575 | A1* | 10/2012 | Chien | H02P 6/182 318/400.35 |
| 2014/0117889 | A1* | 5/2014 | Fujimura | H02P 6/18 318/139 |
| 2015/0002065 | A1* | 1/2015 | Boscolo | H02P 6/182 318/400.35 |
| 2015/0188465 | A1* | 7/2015 | Soh | H02P 6/182 318/400.35 |
| 2017/0126155 | A1* | 5/2017 | Kurosawa | G11B 19/2054 |

* cited by examiner

MOTOR CONTROL DEVICE

CROSS-REFERENCE TO RELATED APPLICATIONS

This nonprovisional application claims priority under 35 U.S.C. § 119(a) on Patent Application No. 2016-112650 filed in Japan on Jun. 6, 2016, the entire contents of which are hereby incorporated by reference.

BACKGROUND OF THE INVENTION

Field of the Invention

The invention disclosed in this specification relates to a motor control device.

Description of Related Art

In order to drive a brushless DC motor without a sensor, it is necessary, for example, to measure counter electromotive forces of phases of the motor, to perform zero-crossing detection, and to obtain a rotational position of a rotor.

Note that as an example of a conventional technique related to above description, there is JP-A-2014-87210 filed by the applicant of this application.

FIG. 19 is a block diagram illustrating a conventional zero-crossing detection method (first conventional example). In the zero-crossing detection method of this diagram, each phase of the motor is provided with an AD converter, and hence counter electromotive forces of phases can be simultaneously AD converted and used for zero-crossing detection process by a microcomputer. However, this conventional example has a problem that multiple AD converters are needed.

FIG. 20 is a block diagram illustrating a conventional zero-crossing detection method (second conventional example). In the zero-crossing detection method of this diagram, each phase of the motor is provided with a sample and hold unit. Therefore, counter electromotive forces of phases can be simultaneously sampled, and their hold values can be sequentially AD converted by a single AD converter. Thus, the number of AD converters in this conventional example can be smaller than that in the first conventional example described above. However, the sample and hold units are additionally needed in this conventional example, and hence further improvement is required in view of circuit scale.

In addition, when motor rotational speed is PWM controlled, noise or rise delay of an induced voltage (including a variation among phases) occurs at or near an on-off switch timing when a PWM on period and a PWM off period are switched. However, in the conventional zero-crossing detection method, sampling timings of the AD converter are always set to the PWM on period regardless of a PWM duty. Therefore, in low-duty drive (i.e. low-speed rotation) in which the PWM on period becomes short, even if each phase of the motor is provided with the AD converter or the sample and hold unit, the sampling timing of the AD converter becomes close to the on-off switch timing, and hence the zero-crossing detection may not be correctly performed.

SUMMARY OF THE INVENTION

In view of the above-mentioned problem found by the inventors of this application, it is an object of the invention disclosed in this specification to provide a motor control device that can correctly perform the zero-crossing detection.

For example, the motor control device disclosed in this specification includes an energization control unit arranged to generate energization control signals of phases of a bridge driver, an AD converter arranged to sample and convert analog feedback voltages corresponding to output voltages of the phases of the bridge driver into digital feedback signals, and a zero-crossing detection unit arranged to receive an input of the feedback signal and to perform zero-crossing detection for determining commutation timing and PWM duty of the energization control signal. Sampling timings of the AD converter are switched to one of a PWM on period and a PWM off period in accordance with the PWM duty.

In addition, for example, the motor control device disclosed in this specification includes an energization control unit arranged to generate energization control signals of phases of a bridge driver, an AD converter arranged to sample and convert analog feedback voltages corresponding to output voltages of the phases of the bridge driver into digital feedback signals, and a zero-crossing detection unit arranged to receive an input of the feedback signal so as to perform zero-crossing detection for determining commutation timing and PWM duty of the energization control signal. The energization control unit PWM drives lower side switches of the phases of the bridge driver, and sampling timings of the AD converter are set to the PWM off period.

In addition, for example, the motor control device disclosed in this specification includes an energization control unit arranged to generate energization control signals of phases of a bridge driver, an AD converter arranged to sample and convert analog feedback voltages corresponding to output voltages of the phases of the bridge driver into digital feedback signals, and a zero-crossing detection unit arranged to receive an input of the feedback signal so as to perform zero-crossing detection for determining commutation timing and PWM duty of the energization control signal. The AD converter performs an AD conversion process of the feedback voltage both in the PWM on period and in the PWM off period, and the zero-crossing detection unit adopts one of AD conversion results in accordance with the PWM duty.

Note that other features, elements, steps, advantages, and characteristics of the present invention will become more apparent from the description of the embodiment given below and the attached drawings related to the description.

DETAILED DESCRIPTION OF THE PREFERRED EMBODIMENTS

<Electronic Apparatus>

Figure 1:
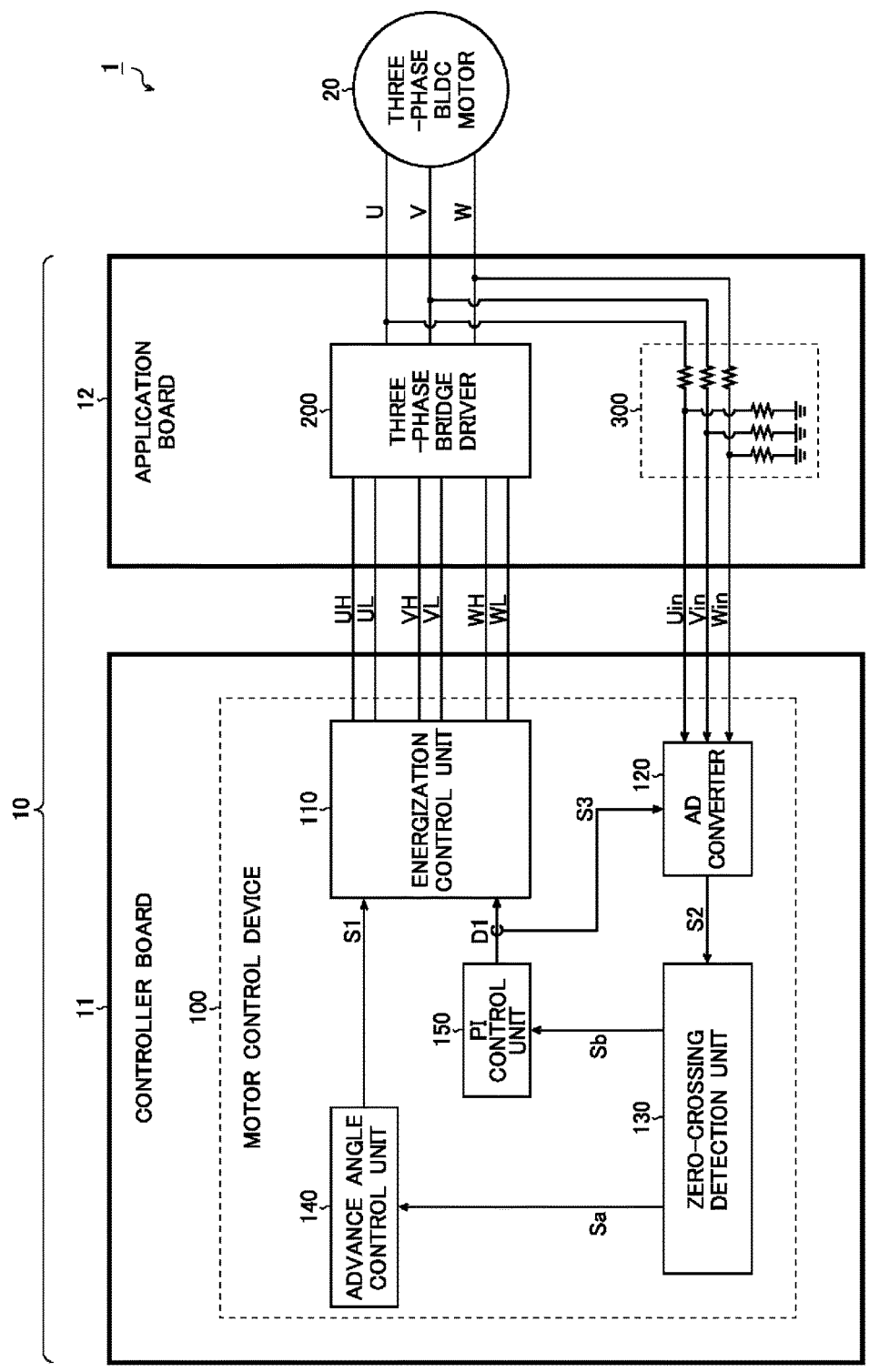
FIG. 1 is a block diagram illustrating a general structure of an electronic apparatus.

FIG. 1 is a block diagram illustrating a general structure of an electronic apparatus. An electronic apparatus 1 of this structural example includes a motor driving device 10 and a three-phase brushless DC motor 20 (hereinafter referred to simply as the motor 20).

The motor driving device 10 is a subject that drives the motor 20 without a sensor, and structural elements thereof are disposed and distributed in a controller board 11 and an application board 12. More specifically, a motor control device 100 is mounted on the controller board 11, while a three-phase bridge driver 200 (hereinafter referred to simply as the driver 200) and an adjusting unit 300 are mounted on the application board 12.

The motor control device 100 receives inputs of feedback voltages Uin, Vin, and Win from the adjusting unit 300 and generates energization control signals UH, UL, VH, VL, WH, and WL so as to output them to the driver 200.

The driver 200 receives inputs of the energization control signals UH, UL, VH, VL, WH, and WL from the motor control device 100 and generates output voltages U, V, and W so as to output them to the motor 20.

The adjusting unit 300 divides the output voltages U, V, and W to generate the feedback voltages Uin, Vin, and Win and outputs them to the motor control device 100. Note that an adjusting method of the feedback voltages Uin, Vin, and Win is not limited to the dividing method, but other adjusting method may be adopted.

<Motor Control Device>

Next, with reference to FIG. 1, a structure and an operation of the motor control device 100 are described in detail. The motor control device 100 of this structural example has functional blocks, which include an energization control unit 110, an analog-to-digital (AD) converter 120, a zero-crossing detection unit 130, an advance angle control unit 140, and a PI control unit 150.

The energization control unit 110 generates the energization control signals UH, UL, VH, VL, WH, and WL of phases of the driver 200 based on both a commutation timing signal S1 input from the advance angle control unit 140 and a duty set value D1 input from the PI control unit 150.

The AD converter 120 sequentially samples the analog feedback voltages Uin, Vin, and Win input from the adjusting unit 300 and converts them into a digital feedback signal S2 so as to output the same to the zero-crossing detection unit 130. Note that the AD converter 120 is supplied with a trigger signal S3 that is pulse driven at a timing corresponding to the duty set value D1 (therefore the PWM duty), and a sampling timing of the AD converter 120 is switched in accordance with the trigger signal S3. This will be described later in detail.

The zero-crossing detection unit 130 receives an input of the feedback signal S2 and performs zero-crossing detection for determining commutation timings and the PWM duties of the energization control signals UH, UL, VH, VL, WH, and WL.

The advance angle control unit 140 performs advance angle control of the commutation timings based on timing information Sa obtained by the zero-crossing detection unit 130, so as to generate the commutation timing signal S1. It is preferred to appropriately adjust an advance angle amount of the commutation timing signal 51 in consideration of a signal delay of the zero-crossing detection unit 130 and phase shifts between the energization control signal (UH, UL, VH, VL, WH, WL) and the output voltage (U, V, W).

The PI control unit 150 performs PI control of the duty set value D1 (therefore the PWM duty) in accordance with speed information Sb obtained by the zero-crossing detection unit 130. This PI control is one type of feedback control in which proportional control (P control) and integral control (I control) are combined. However, the feedback control method of the duty set value D1 is not limited to the PI control. For example, it is possible to use PID control in which differential control (D control) is combined with the PI control.

Among the functional blocks described above, the energization control unit 110 and the AD converter 120 correspond to functional blocks for performing a hardware process similarly to the driver 200 mounted on the application board 12. On the other hand, the zero-crossing detection unit 130, the advance angle control unit 140, and the PI control unit 150 correspond to functional blocks for performing a software process.

In addition, the motor control device 100 can communicate with an external system via a predetermined communication interface (e.g. an I²C interface), and can instruct and change parameters such as start and stop of operation (rotation), change of target speed, change of gain in the PI control, and acquisition of internal status. For example, when change of hardware structure (such as change of type of the motor 20) occurs, an intended operation can be realized by adjusting various parameters.

<Three-phase Bridge Driver>

Figure 2:
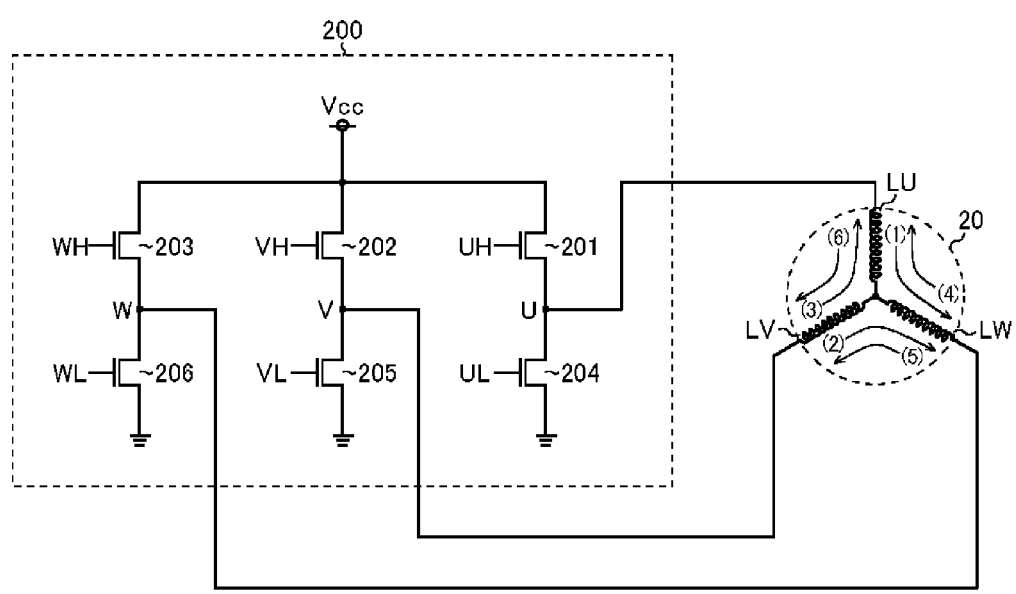
FIG. 2 is a circuit diagram illustrating a structural example of a three-phase bridge driver.

FIG. 2 is a circuit diagram illustrating a structural example of the driver 200. The driver 200 of this structural example is a circuit type to which a general H bridge output stage is applied, and includes upper side switches 201, 202, and 203 and lower side switches 204, 205, and 206. The upper side switches 201, 202, and 203 are connected between an application terminal of the power supply voltage Vcc and output terminals of the output voltages U, V, and W, respectively. The lower side switches 204, 205, and 206 are connected between a ground terminal and output terminals of the output voltages U, V, and W, respectively. Note that a metal oxide semiconductor field effect transistor (MOSFET), an insulated gate bipolar transistor (IGBT), or the like can be appropriately used for each switch.

The upper side switches 201, 202, and 203 are turned on and off in accordance with the upper side energization control signals UH, VH, and WH, respectively. More specifically, the upper side switches 201, 202, and 203 are turned on when the upper side energization control signals UH, VH, and WH are high level, respectively, and are turned off when the upper side energization control signals UH, VH, and WH are low level, respectively.

On the other hand, the lower side switches 204, 205, and 206 are turned on and off in accordance with the lower side energization control signals UL, VL, and WL, respectively. More specifically, the lower side switches 204, 205, and 206 are turned on when the lower side energization control signals UL, VL, and WL are high level, respectively, and are turned off when the lower side energization control signals UL, VL, and WL are low level, respectively.

Note that the output voltages U, V, and W of the phases are respectively applied to stator coils LU, LV, and LW of the phases of the motor 20, whose energized states are switched in accordance with a combination of the output voltages U, V, and W. For example, when the energization control unit 110 performs 120-degree energization control, there are six energized states as illustrated by arrows (1) to (6) in the diagram. Note that the 120-degree energization control is one of scalar controls and is also called a six-step rectangular wave control.

<120-degree Energization Control>

Figure 3:
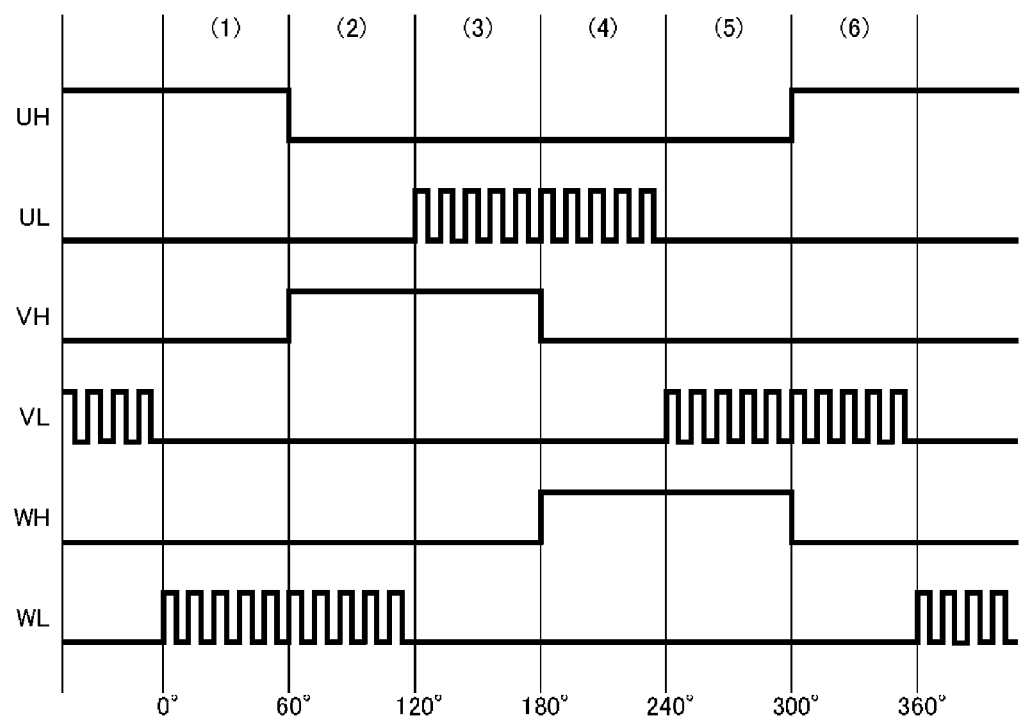
FIG. 3 is a timing chart illustrating an example of 120-degree energization control.

Next, the 120-degree energization control is described in detail with reference to FIGS. 2 and 3. FIG. 3 is a timing chart illustrating an example of the 120-degree energization control, and shows, in order from upper to lower, the U-phase upper side energization control signal UH, the U-phase lower side energization control signal UL, the V-phase upper side energization control signal VH, the V-phase lower side energization control signal VL, the W-phase upper side energization control signal WH, and the W-phase lower side energization control signal WL. In the following description, one period (electric angle from 0 to 360 degrees) is divided into six periods (1) to (6) (having an electric angle of 60 degrees each) for detailed description.

In the period (1), the upper side switch 201 of the U-phase is turned on while the lower side switch 206 of the W-phase is PWM driven. In addition, other switches 202, 203, 204, and 205 are all turned off. In this case, U=High, V=OPEN, and W=Low (PWM) are satisfied, and drive current flows in the motor 20 from the U-phase stator coil LU to the W-phase stator coil LW as illustrated by the arrow (1) in FIG. 2.

In the period (2), the upper side switch 202 of the V-phase is turned on while the lower side switch 206 of the W-phase is PWM driven. In addition, other switches 201, 203, 204, and 205 are all turned off. In this case, U=OPEN, V=High, and W=Low (PWM) are satisfied, and drive current flows in the motor 20 from the V-phase stator coil LV to the W-phase stator coil LW as illustrated by the arrow (2) in FIG. 2.

In the period (3), the upper side switch 202 of the V-phase is turned on while the lower side switch 204 of the U-phase is PWM driven. In addition, other switches 201, 203, 205, and 206 are all turned off. In this case, U=Low (PWM), V=High, and W=OPEN are satisfied, and drive current flows in the motor 20 from the V-phase stator coil LV to the U-phase stator coil LU as illustrated by the arrow (3) in FIG. 2.

In the period (4), the upper side switch 203 of the W-phase is turned on while the lower side switch 204 of the U-phase is PWM driven. In addition, other switches 201, 202, 205, and 206 are all turned off. In this case, U=Low (PWM), V=OPEN, and W=High are satisfied, and drive current flows in the motor 20 from the W-phase stator coil LW to the U-phase stator coil LU as illustrated by the arrow (4) in FIG. 2.

In the period (5), the upper side switch 203 of the W-phase is turned on while the lower side switch 205 of the V-phase is PWM driven. In addition, other switches 201, 202, 204, and 206 are all turned off. In this case, U=OPEN, V=Low (PWM), and W=High are satisfied, and drive current flows in the motor 20 from the W-phase stator coil LW to the V-phase stator coil LV as illustrated by the arrow (5) in FIG. 2.

In the period (6), the upper side switch 201 of the U-phase is turned on while the lower side switch 205 of the V-phase is PWM driven. In addition, other switches 202, 203, 204, and 206 are all turned off. In this case, U=High, V=Low (PWM), and W=OPEN are satisfied, and drive current flows in the motor 20 from the U-phase stator coil LU to the V-phase stator coil LV as illustrated by the arrow (6) in FIG. 2.

In this way, in the 120-degree energization control, among the U-phase, the V-phase, and the W-phase, two phases are applied with the output voltages U, V, and W so that the energization pattern of the stator coils LU, LV, and LW is periodically switched (i.e. commutation is performed), and thus the motor 20 is driven to rotate.

In addition, because the lower side switches 204, 205, and 206 are PWM driven, magnetic forces generated in the stator coils LU, LV, and LW can be changed in accordance with the PWM duty (i.e. a ratio of a PWM on period Ton to a PWM period T), and thus rotational speed control of the motor 20 can be performed. Note that it is usual to perform PWM drive of the upper side switches 201, 202, and 203 for rotational speed control of the motor 20, but PWM drive of the lower side switches 204, 205, and 206 is performed in this diagram. The reason of this will be described later in detail.

In addition, although the 120-degree energization control is exemplified in this diagram, the energization control method by the energization control unit 110 is not limited to this. It is possible to adopt 150 degrees energization control or 180 degrees energization control.

<Motor Drive Control>

Figure 4:
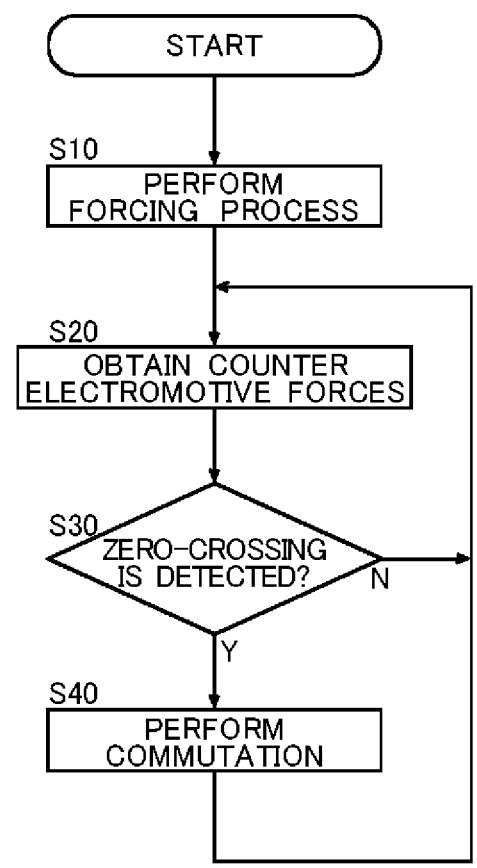
FIG. 4 is a flowchart illustrating an example of motor drive control.

FIG. 4 is a flowchart illustrating an example of motor drive control (from start to steady-state rotation of the motor 20).

In the 120-degree energization control of the motor 20, it is necessary to switch application patterns of the output voltages U, V, and W at appropriate commutation timings by tracking rotor position. Here, when driving the motor 20 without a sensor, the counter electromotive forces generated along with rotation of the rotor are detected so as to estimate the rotor position, and the commutation timings are adjusted in accordance with a result of the estimation. Therefore, in order to start the motor 20, it is necessary to forcibly rotate the rotor in standstill condition so that the counter electromotive forces are generated.

Therefore, when the flow is started, first in Step S10, the rotor forcibly rotated by a predetermined forcing process. As the forcing process in this step, for example, a specific magnetic field is generated for a predetermined period so that the rotor is fixed to a unique rotational position, and then forced commutation is repeated with a fixed duty so that forced acceleration of the rotor is performed.

Note that start conditions of the motor 20 (such as period and duty of the rotor position fixing process, and period, duty, start speed, end speed, and division steps of the forced acceleration process of the rotor) are changed depending on a type of the motor 20, an object (load) connected to the motor 20, and the like. Therefore, it is preferred to adopt a structure in which a user can arbitrarily set parameters concerning the start conditions described above.

When the rotor starts to rotate at a certain degree of speed by the forcing process in Step S10, the counter electromotive forces can be measured, and hence in Step S20, a process of obtaining the counter electromotive forces is performed.

In the next Step S30, it is determined whether or not a zero-crossing (that is described later in detail) is detected. Here, if the determination result is yes, a rotational position of the rotor can be grasped from a detection result of the zero-crossing, and hence the flow proceeds to Step S40. On the other hand, if the determination result is no, the flow returns to Step S20, and the counter electromotive forces are obtained again.

If the determination result is yes in Step S30, the application pattern of the output voltages U, V, and W is switched at an appropriate commutation timing corresponding to the rotational position of the rotor in Step S40. After that, the flow returns to Step S20, and acquisition of the counter electromotive forces is repeated for detecting next zero-crossing. After that, Steps S20 to S40 are repeated so that steady-state rotation of the motor 20 is continued.

<Zero-crossing Detection>

Figure 5:
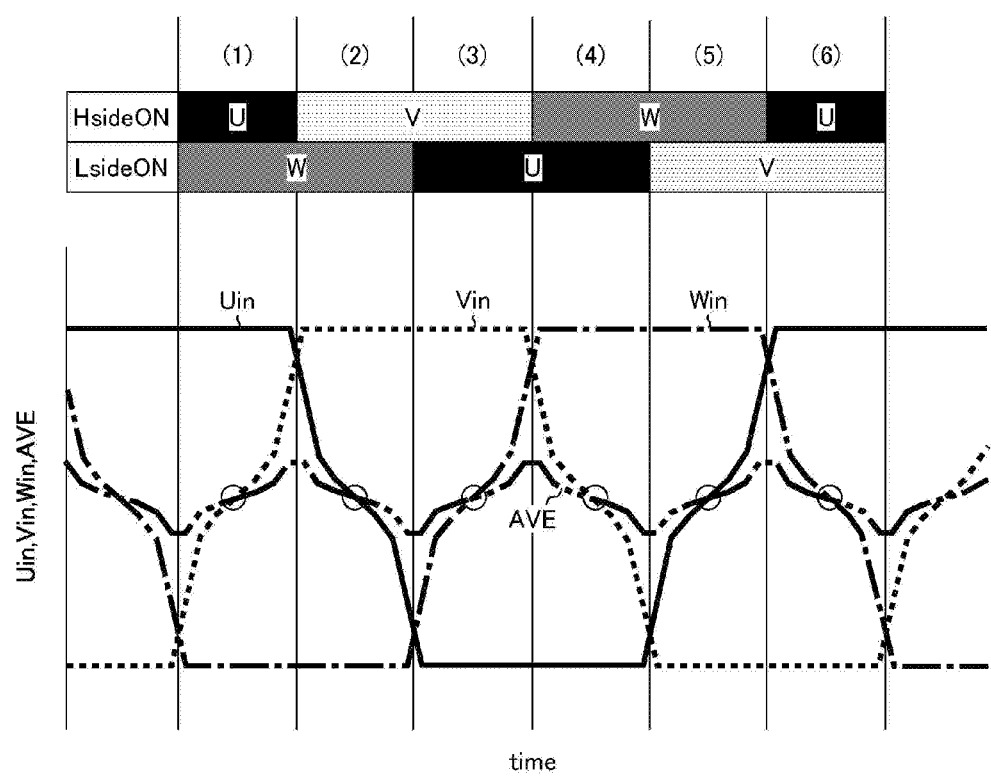
FIG. 5 is a timing chart illustrating an example of zero-crossing detection.

FIG. 5 is a timing chart illustrating an example of the zero-crossing detection and shows, in order from upper to lower, an on-phase of the upper side switch and an on-phase of the lower side switch in the driver 200, the feedback voltages of the phases (Uin (solid line), Vin (broken line), and Win (dot-dashed line)), and an average voltage AVE of all phases (=(Uin+Vin+Win)/3, which corresponds to a voltage at a pseudo-neutral point of the motor 20). However, in this diagram, for convenience sake of illustration, PWM drive of the lower side switch in the driver 200 is not illustrated. In the following description, one period (electric angle from 0 to 360 degrees) is divided into six periods (1) to (6) (having an electric angle of 60 degrees each) for detailed description.

In the period (1), Uin=High, Vin=OPEN, and Win=Low (PWM) are satisfied, and hence a counter electromotive voltage generated in the stator coil LV of the non-drive phase (V-phase) appears as the feedback voltage Vin. The timing at which the feedback voltage Vin and the average voltage AVE cross each other (i.e. zero-crossing) corresponds to the timing at which poles of the rotor (S pole and N pole) are switched at the rotational position at which the stator coil LV is disposed. Note that in the period (1), the zero-crossing detection unit 130 detects the timing at which the feedback voltage Vin is changed from a state lower than the average voltage AVE to a state higher than the same.

In period (2), U=OPEN, V=High, and W=Low (PWM) are satisfied, and hence a counter electromotive voltage generated in the stator coil LU of the non-drive phase (U-phase) appears as the feedback voltage Uin. The timing at which the feedback voltage Uin and the average voltage AVE cross each other (i.e. the zero-crossing) corresponds to the timing at which poles of the rotor (S pole and N pole) are switched at the rotational position at which the stator coil LU is disposed. Note that in the period (2), the zero-crossing detection unit 130 detects the timing at which the feedback voltage Uin is changed from a state higher than the average voltage AVE to a state lower than the same.

In the period (3), U=Low (PWM), V=High, and W=OPEN are satisfied, and hence a counter electromotive voltage generated in the stator coil LW of the non-drive phase (W-phase) appears as the feedback voltage Win. The timing at which the feedback voltage Win and the average voltage AVE cross each other (i.e. the zero-crossing) corresponds to the timing at which poles of the rotor (S pole and N pole) are switched at the rotational position at which the stator coil LW is disposed. Note that in the period (3), the zero-crossing detection unit 130 detects the timing at which the feedback voltage Win is changed from a state lower than the average voltage AVE to a state higher than the same.

In the period (4), U=Low (PWM), V=OPEN, and W=High are satisfied, and hence a counter electromotive voltage generated in the stator coil LV of the non-drive phase (V-phase) appears as the feedback voltage Vin similarly to the period (1). However, in the period (4), unlike the period (1) described above, the zero-crossing detection unit 130 detects the timing at which the feedback voltage Vin is changed from a state higher than the average voltage AVE to a state lower than the same.

In the period (5), U=OPEN, V=Low (PWM), and W=High are satisfied, and hence a counter electromotive voltage generated in the stator coil LU of the non-drive phase (U-phase) appears as the feedback voltage Uin similarly to the period (2). However, in the period (5), unlike the period (2) described above, the zero-crossing detection unit 130 detects the timing at which the feedback voltage Uin is changed from a state lower than the average voltage AVE to a state higher than the same.

In the period (6), U=High, V=Low (PWM), and W=OPEN are satisfied, and hence a counter electromotive voltage generated in the stator coil LW of the non-drive phase (W-phase) appears as the feedback voltage Win similarly to the period (3). However, in the period (6), unlike the period (3) described above, the zero-crossing detection unit 130 detects the timing at which the feedback voltage Win is changed from a state higher than the average voltage AVE to a state lower than the same.

As described above, the zero-crossing detection unit 130 compares the average voltage (=AVE) of all phases with the induced voltage of the non-drive phase for the feedback voltages Uin, Vin, and Win, so as to perform the zero-crossing detection. By performing this zero-crossing detection, rotor pole switching timing (therefore rotational position of the rotor) can be detected without a sensor. Therefore, by performing the commutation when a predetermined time elapses after detection of the zero-crossing, the motor 20 can be continuously rotated.

Figure 6:
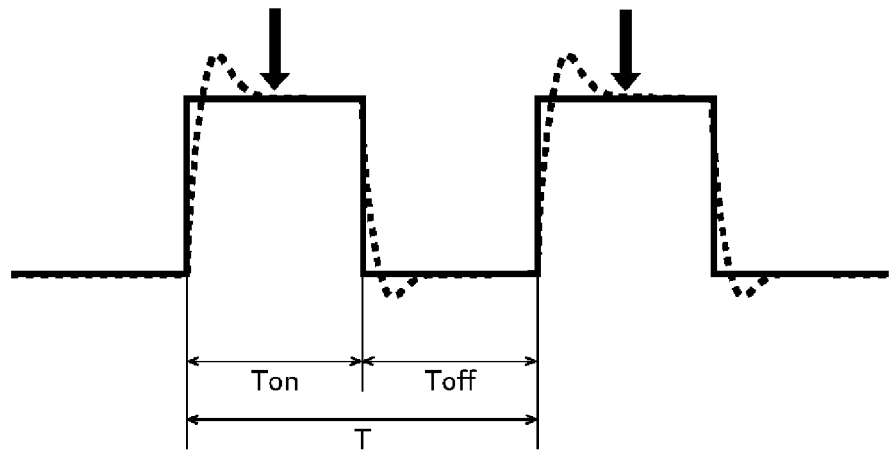
FIG. 6 is a waveform diagram illustrating a simultaneous sampling operation of induced voltages.
Figure 19:
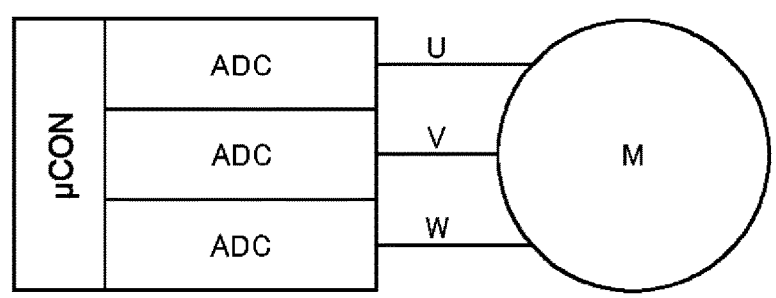
FIG. 19 is a block diagram illustrating a conventional zero-crossing detection method (first conventional example).
Figure 20:
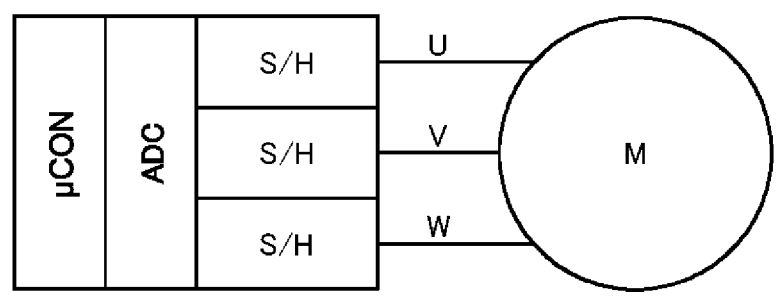
FIG. 20 is a block diagram illustrating a conventional zero-crossing detection method (second conventional example).

FIG. 6 is a waveform diagram illustrating a simultaneous sampling operation of the induced voltages (i.e. the counter electromotive voltages), in which a solid line indicates a PWM signal, and a broken line indicates the induced voltage. Note that thick arrows in the diagram indicate simultaneous sampling timing. As illustrated in FIG. 19 or 20, in the case where the AD converter or the sample and hold unit is disposed for each phase of the motor, the induced voltages of the three phases can be simultaneously sampled, so that results of AD conversion of them can be used in the zero-crossing detection process.

Note that noise or rise delay of the induced voltage (including a variation among phases) occurs at or near an on-off switch timing when the PWM on period Ton and a PWM off period Toff are switched. In view of this, it is preferred to set sampling timing of the induced voltage at or near the middle of the PWM on period Ton. However, when the PWM duty is small (i.e. when the motor 20 is driven at low speed), the sampling timing of the induced voltage becomes close to the on-off switch timing, and hence the zero-crossing may not be correctly detected.

Figure 7:
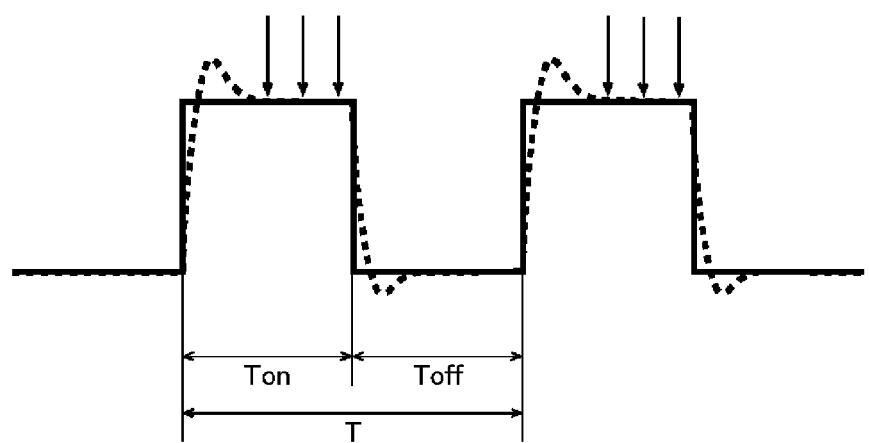
FIG. 7 is a waveform diagram illustrating a sequential sampling operation of induced voltages.

FIG. 7 is a waveform diagram illustrating a sequential sampling operation of the induced voltages (i.e. counter electromotive voltages), in which a solid line indicates the PWM signal, and a broken line indicates the induced voltage. Note that three thin arrows indicate sequential sampling timings. In order to sample the induced voltages of the three phases by a smaller number of (one or two) AD converters, it is necessary to sequentially sample the induced voltages of the phases, and hence more time is necessary for the AD conversion process than in the simultaneous sampling operation (FIG. 6).

Therefore, when the PWM duty is small (i.e. when the motor 20 is driven at low speed), the AD conversion process may not be completed within the PWM on period Ton, and hence it is more difficult to correctly detect the zero-crossing than in the structure in which the induced voltages are simultaneously sampled.

Note that in the zero-crossing detection process, the induced voltage of the non-drive phase among the feedback voltages Uin, Vin, and Win of the three phases, which is compared with the pseudo-neutral point voltage, has an important role. Therefore, when the number of AD converters is smaller than the number of phases of the motor, it is considered to AD convert only the induced voltage of the non-drive phase regarding the pseudo-neutral point voltage as a fixed value. However, in this method, an influence of offset or pulsation (i.e., voltage variation in long period) of the entire feedback voltages Uin, Vin, and Win cannot be eliminated, and hence further improvement is needed in view of zero-crossing detection accuracy.

In the following description, there is proposed a novel method (i.e. sampling timing switching control) that enables to correctly detect the zero-crossing even if the number of AD converters is smaller than the number of phases of the motor.

<Sampling Timing Switching Control>

Figure 8:
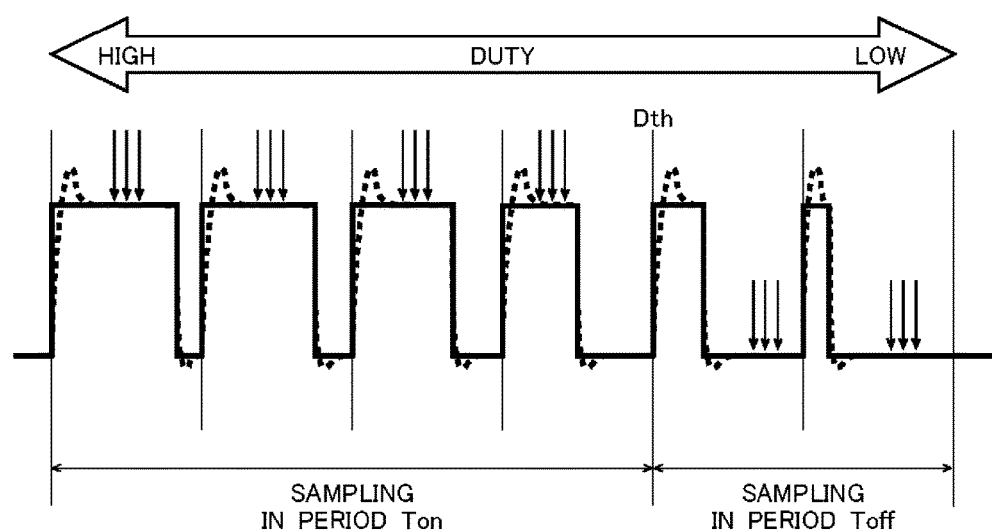
FIG. 8 is a waveform diagram illustrating an example of sampling timing switching control.

FIG. 8 is a waveform diagram illustrating an example of the sampling timing switching control, in which a solid line indicates the PWM signal, and a broken line indicates the induced voltage. Note that three thin arrows indicate sequential sampling timings. As illustrated in this diagram, the sampling timings of the AD converter 120 are switched to one of the PWM on period Ton and the PWM off period Toff in accordance with the PWM duty (therefore rotational speed of the motor 20).

More specifically, the sampling timings of the AD converter 120 are set to the PWM on period Ton if the PWM duty is higher than a predetermined threshold duty Dth, and are set to the PWM off period Toff if the PWM duty is lower than the threshold duty Dth.

Note that the threshold duty Dth described above should be set to 50% in the simplest thinking. However, the set value of the threshold duty Dth is not limited to this, and the threshold duty Dth can be set to an arbitrary value within a range that causes no harm to the AD conversion process. For example, if there is a harm to the sequential sampling operation in the PWM on period Ton when the PWM duty is lower than 10% in low-speed rotation, the threshold duty Dth should be set to a value a little higher than 10% (e.g. approximately 20%).

In this way, with the structure in which the sampling timings of the AD converter 120 are switched in accordance with the PWM duty, there is a time allowance in the AD conversion process. Therefore, even in an application in which the PWM duty is largely changed, the sequential sampling operation is hardly interfered, and hence the motor 20 can be stably driven from a high speed range to a low speed range.

In addition, with this method, it is not necessary to sample all the induced voltages of the three phases at the same time. Therefore, compared with the structure of FIG. 19 or 20, the number of AD converters can be reduced, or it is not necessary to dispose an additional sample and hold unit.

In addition, with this method, it is possible to measure all the feedback voltages Uin, Vin, and Win of the three phases so as to calculate the pseudo-neutral point voltage (i.e. average voltage AVE) of the motor 20, and to compared the pseudo-neutral point voltage with the induced voltage of the non-drive phase. Therefore, compared with the method of regarding the pseudo-neutral point voltage as a fixed value, it is hardly affected by the offset or pulsation of the entire feedback voltages Uin, Vin, and Win, and hence it can improve accuracy of zero-crossing detection. In addition, it can flexibly support specification changes of the motor 20.

Figure 9:
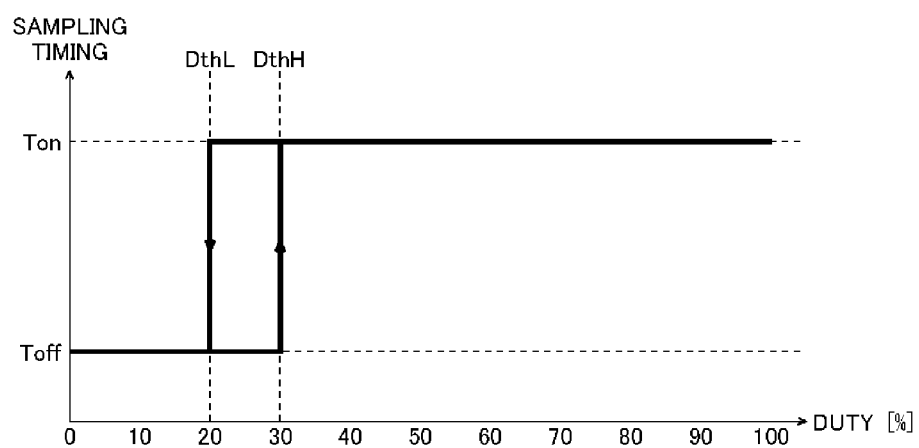
FIG. 9 is a hysteresis characteristic diagram of a threshold duty.

FIG. 9 is a hysteresis characteristic diagram of the threshold duty Dth. As illustrated in this diagram, the threshold duty Dth may have hysteresis characteristics.

For example, when the sampling timings are set to the PWM on period Ton, the sampling timings are switched to the PWM off period Toff when the PWM duty becomes lower than a lower side threshold duty DthL (e.g. DthL=20%).

On the other hand, when the sampling timings are set to the PWM off period Toff, the sampling timings are switched to the PWM on period Ton when the PWM duty becomes higher than an upper side threshold duty DthH (e.g. DthH=30%).

By adopting this structure, it is possible to prevent unnecessary switching of the sampling timings at or near the threshold duty Dth.

Figure 10:
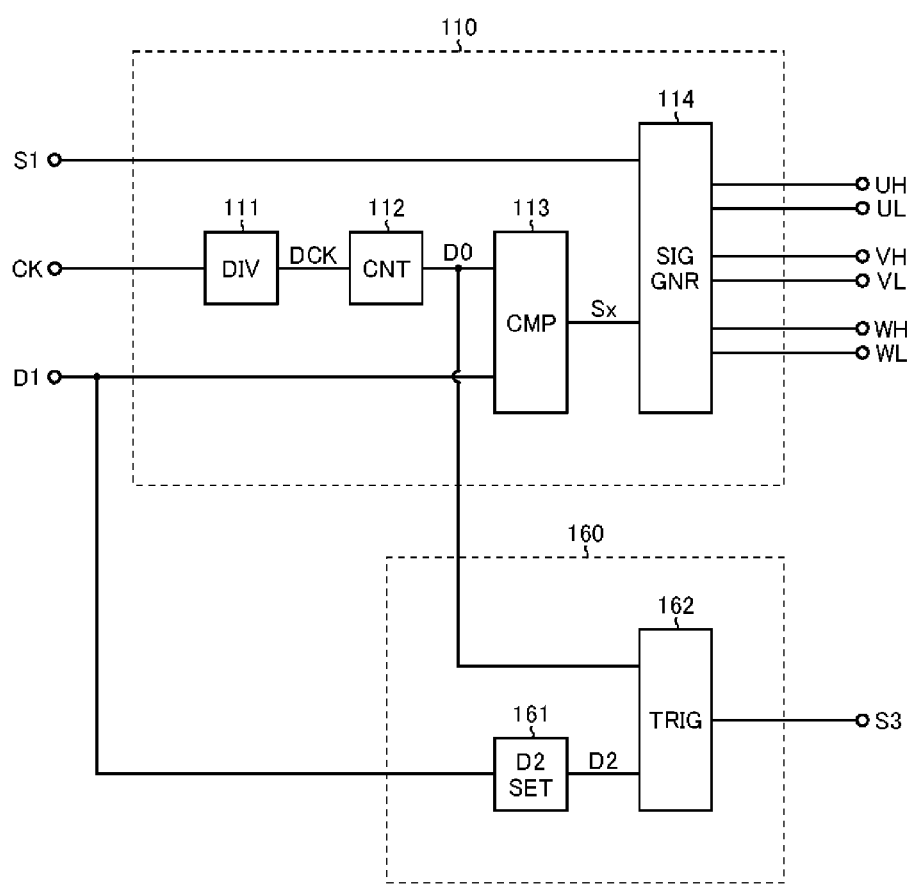
FIG. 10 is a block diagram illustrating a structural example of an energization control unit and a timing control unit.

FIG. 10 is a block diagram illustrating a structural example of the energization control unit 110 and a timing control unit 160. The energization control unit 110 in this structural example includes a frequency divider 111, a counter 112, a comparator 113, and an energization control signal generator 114.

The frequency divider 111 divides by m (e.g. divides by two) a master clock signal CK (e.g. 24 MHz) that is used in the motor control device 100 so as to generate a divided clock signal DCK (e.g. 12 MHz).

The counter 112 counts the number of pulses in the divided clock signal DCK and outputs a count value D0. Note that as the counter 112, for example, it is possible to appropriately use an up/down counter that repeats increment and decrement of the count value D0 between a predetermined maximum value D0H (e.g. 600) and a minimum value D0L (e.g. 0).

The comparator 113 compares the duty set value D1 for setting the PWM duty with the count value D0 input from the counter 112, so as to generate a PWM signal Sx for PWM driving the energization control signal (for example, the lower side energization control signals UL, VL, and WL). Note that the PWM signal Sx becomes high level when the count value D0 is smaller than the duty set value D1, and becomes low level when the count value D0 is larger than the duty set value D1, for example.

The energization control signal generator 114 receives inputs of the commutation timing signal S1 and the PWM signal Sx so as to generate the energization control signals UH, UL, VH, VL, WH, and WL.

On the other hand, the timing control unit 160 is a functional block that receives inputs of the count value D0 and the duty set value D1 so as to generate the trigger signal S3 (i.e. a sampling timing set signal of the AD converter 120), and includes a trigger set value switching unit 161, and a trigger signal generator 162. Note that the timing control unit 160 may be installed as software or as hardware.

The trigger set value switching unit 161 switches a trigger set value D2 in accordance with the duty set value D1. For example, the trigger set value D2 is switched to one of the maximum value D0H and the minimum value D0L of the count value D0 in accordance with the duty set value D1.

The trigger signal generator 162 performs a matching determination process between the count value D0 and the trigger set value D2, and generates a pulse of the trigger signal S3 in accordance with a result of the determination. In other words, the sampling timings of the AD converter 120 are determined by the matching determination process between the count value D0 and the trigger set value D2.

Figure 11:
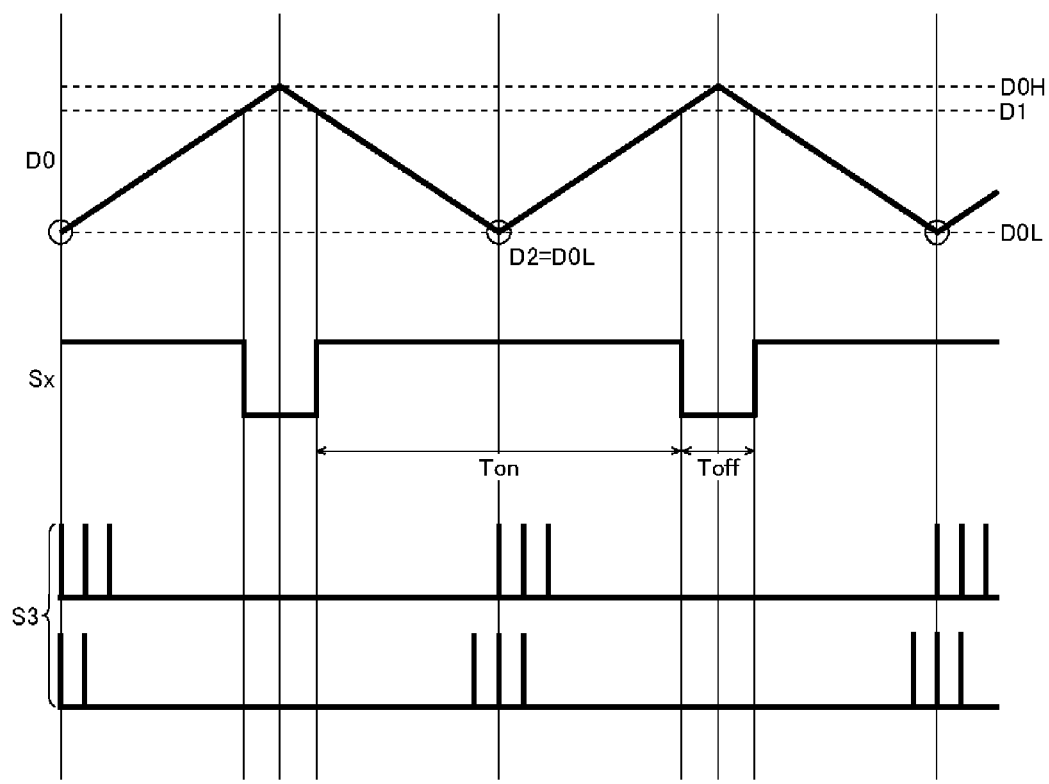
FIG. 11 is a timing chart illustrating a first setting example of sampling timings.
Figure 12:
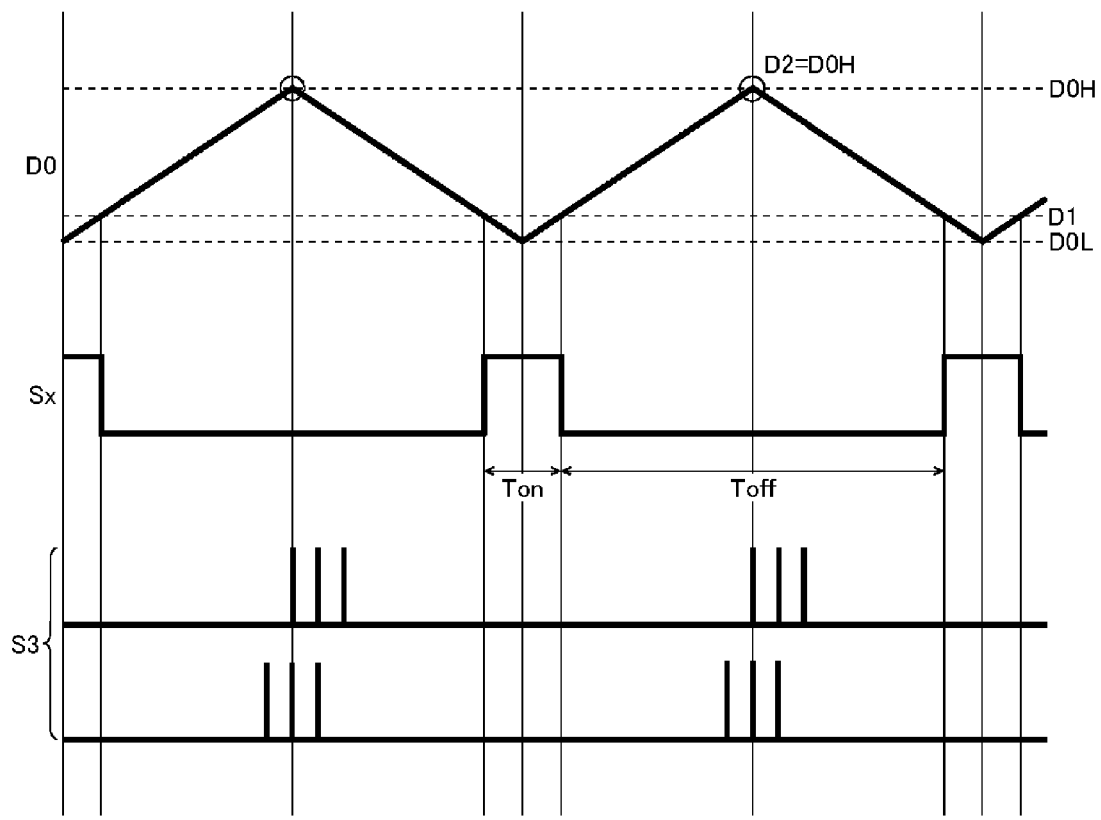
FIG. 12 is a timing chart illustrating a second setting example of sampling timings.

FIGS. 11 and 12 are respectively timing charts of a first setting example (in a high duty) and a second setting example (in a low duty) of the sampling timings, and shows, in order from upper to lower, the count value D0, the PWM signal Sx, and the trigger signal S3.

Note that in the example of this diagram, the up/down counter is used as the counter 112, and the count value D0 repeats increment and decrement between the maximum value D0H (e.g. 600) and the minimum value D0L (e.g. 0).

Here, when frequency of the divided clock signal DCK is 12 MHz, the count value D0 is incremented or decremented every $1/12$ μs. Therefore, it is understood that, for example, in order to set the frequency of the PWM signal Sx to 20 kHz (a period of 0.05 ms), the maximum value D0H of the count value D0 should be set to 600 (−0.05 ms/($1/12$ μs)), and the minimum value D0L should be set to 0.

In addition, as described above, the PWM signal Sx is generated by the comparing process between the count value D0 and the duty set value D1. Therefore, as the duty set value D1 is larger, the PWM duty becomes higher (see FIG. 11), and as the duty set value D1 is smaller, the PWM duty becomes lower (see FIG. 12).

For example, when D1 is 600 (=D0H), the PWM duty becomes 100%. When D1 is 300 (−(D0H+D0L)/2), the PWM duty becomes 50%. When D1 is 0 (−D0L), the PWM duty becomes 0%.

In addition, the pulse generation timing (i.e. the sampling timing of the AD converter 120) of the trigger signal S3 is determined by the matching determination process between the count value D0 and the trigger set value D2. More specifically, three pulses are set in the trigger signal S3 with reference to match timing between the count value D0 and the trigger set value D2.

Here, the trigger set value D2 is switched to one of the maximum value D0H and the minimum value D0L of the count value D0 in accordance with the duty set value D1. For example, when the duty set value D1 is higher than a predetermined threshold value, D2 is switched to D0L as illustrated in FIG. 11. As a result, the count value D0 coincides with the trigger set value D2 (=D0L) at or near the middle of PWM on period Ton, so that pulse generation of the trigger signal S3 is performed. In other words, when the duty set value D1 is higher than the predetermined threshold value, the sequential sampling operation is performed at or near the middle of the PWM on period Ton.

On the other hand, when the duty set value D1 is lower than the predetermined threshold value, D2 is switched to D0H as illustrated in FIG. 12. As a result, the count value D0 coincides with the trigger set value D2 (=D0H) at or near the middle of the PWM off period Toff, and the pulse generation of the trigger signal S3 is performed. In other words, when the duty set value D1 is lower than the predetermined threshold value, the sequential sampling operation is performed at or near the middle of the PWM off period Toff.

Note that when only one AD converter 120 is disposed, the pulses of the same number as the number of phases of the motor are sequentially generated in the trigger signal S3 as illustrated in this diagram, and an input channel of the AD converter 120 is dynamically switched.

In addition, the sampling timings and sampling intervals of the AD converter 120 should be appropriately set in consideration of the time necessary for the AD conversion process. For example, the three pulses may be generated so that the match timing between the count value D0 and the trigger set value D2 becomes the head as shown by the trigger signal S3 of the upper row, or the three pulses may be generated so that the match timing between the count value D0 and the trigger set value D2 becomes the middle as shown by the trigger signal S3 of the lower row, out of the trigger signals S3 shown in two rows in this diagram.

<PWM Drive>

Next, there is described a difference between the case where the upper side switches 201, 202, and 203 are PWM driven and the case where the lower side switches 204, 205, and 206 are PWM driven when performing the rotational speed control of the motor 20.

Figure 13:
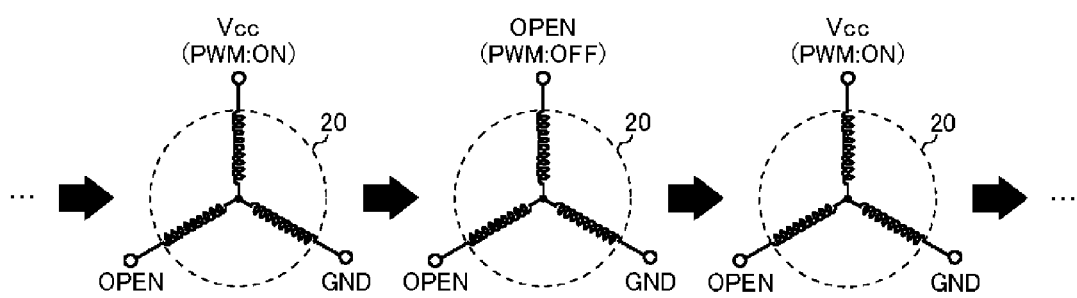
FIG. 13 is a schematic diagram illustrating motor conditions in an upper side PWM drive.

FIG. 13 is a schematic diagram illustrating motor conditions in an upper side PWM drive. When the upper side switches are PWM driven as illustrated in this diagram, the output voltage of a high level phase (PWM drive phase) is alternately switched between Vcc and OPEN such as Vcc (PWM on) to OPEN (PWM off) to Vcc (PWM on). In this case, the output voltage of the non-drive phase (OPEN phase) can be positive or negative with respect to the voltage value of the low level phase (fixed to GND) as a reference value. In other words, the output voltage of the non-drive phase can be a negative potential (i.e. lower than GND).

Figure 14:
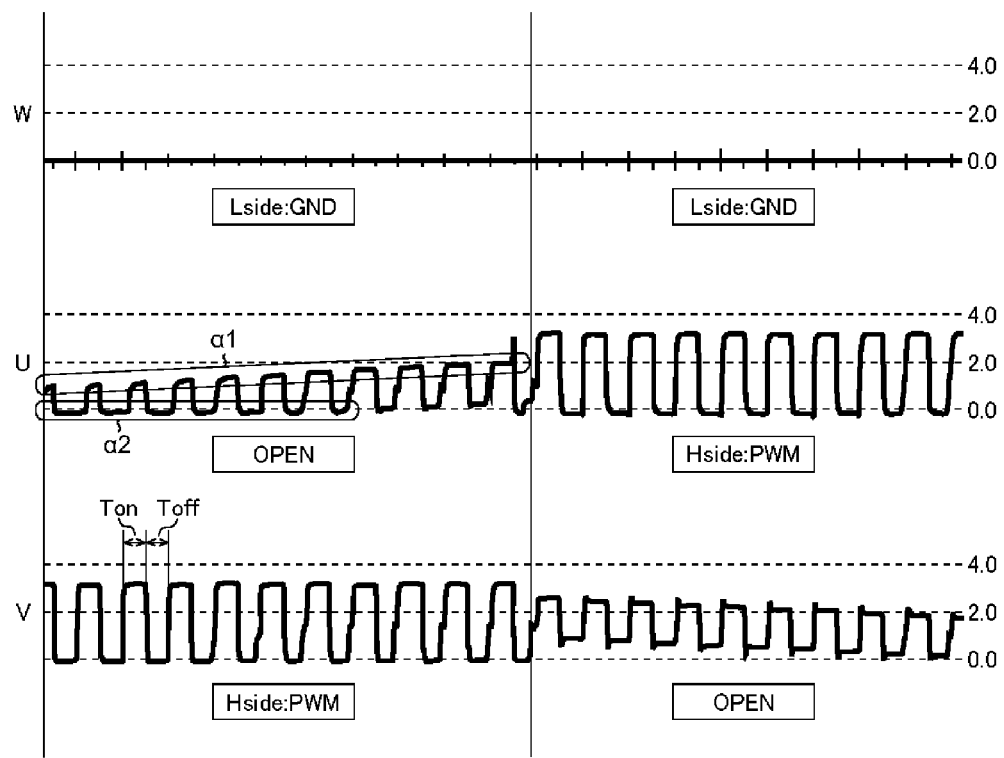
FIG. 14 is a waveform diagram illustrating output voltages in the upper side PWM drive.

FIG. 14 is a waveform diagram illustrating the output voltages U, V, and W in the upper side PWM drive (with a PWM duty of 50%). In the PWM on period Ton of the upper side switch (e.g. the V-phase upper side switch), an induced voltage appears as the output voltage of the non-drive phase (e.g. the U-phase output voltage U) at or near the middle point between the power supply voltage Vcc and the ground voltage GND (see an area a1 in this diagram). Therefore, there is no particular problem in the signal processing by the AD converter 120.

On the other hand, in the PWM off period Toff of the upper side switch (e.g. the V-phase upper side switch), the output voltage of the non-drive phase (e.g. the U-phase output voltage U) can be a negative potential as described above (see an area α2 in this diagram). In this situation, the AD converter 120 is saturated at a lower limit, and hence it is difficult to correctly detect the zero-crossing.

From above description, when the upper side switches 201, 202, and 203 are PWM driven, in order to set the sampling timing of the AD converter 120 in the PWM on period Toff, it is necessary to devise eliminating the lower limit saturation of the AD converter 120.

Figure 15:
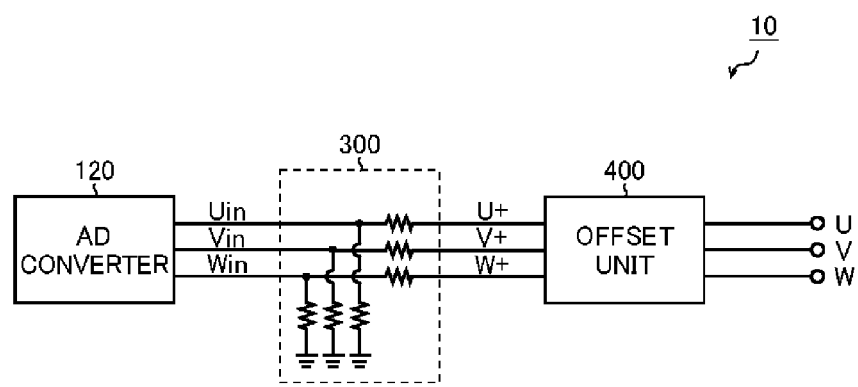
FIG. 15 is a block diagram illustrating an example of feedback voltage adjusting means in the upper side PWM drive.

FIG. 15 is a block diagram illustrating an example of feedback voltage adjusting means in the upper side PWM drive (an additional example of an offset unit 400). As illustrated in this diagram, the motor driving device 10 of this structural example includes the offset unit 400 in a prestage of the adjusting unit 300. Note that the offset unit 400 is a functional block that applies a predetermined offset to the output voltage U, V, W that can be a negative potential, so as to generate positively biased output voltages (U+, V+, W+).

By adding this offset unit 400, the feedback voltages Uin, Vin, Win can be adjusted to be within the input range of the AD converter 120. Therefore, the lower limit saturation of the AD converter 120 can be eliminated, and hence the sampling timings of the AD converter 120 can be set to the PWM on period Toff even in the upper side PWM drive. However, it is necessary to note that a circuit scale is increased by adding the offset unit 400.

Figure 16:
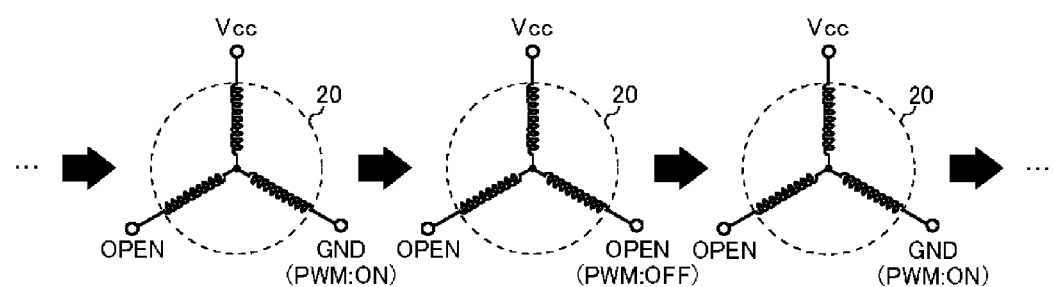
FIG. 16 is a schematic diagram illustrating motor conditions in a lower side PWM drive.

FIG. 16 is a schematic diagram illustrating motor conditions in a lower side PWM drive. As illustrated in this diagram, when the lower side switches are PWM driven, the output voltage of the low level phase (PWM drive phase) is alternately switched between GND and OPEN such as GND (PWM on) to OPEN (PWM off) to GND (PWM on). In this case, the output voltage of the non-drive phase (OPEN phase) can be positive or negative with respect to the voltage value of the high level phase (fixed to Vcc) as the reference value. Therefore, unlike the upper side PWM drive described above, the output voltage of the non-drive phase does not become a negative potential (i.e. lower than GND).

Figure 17:
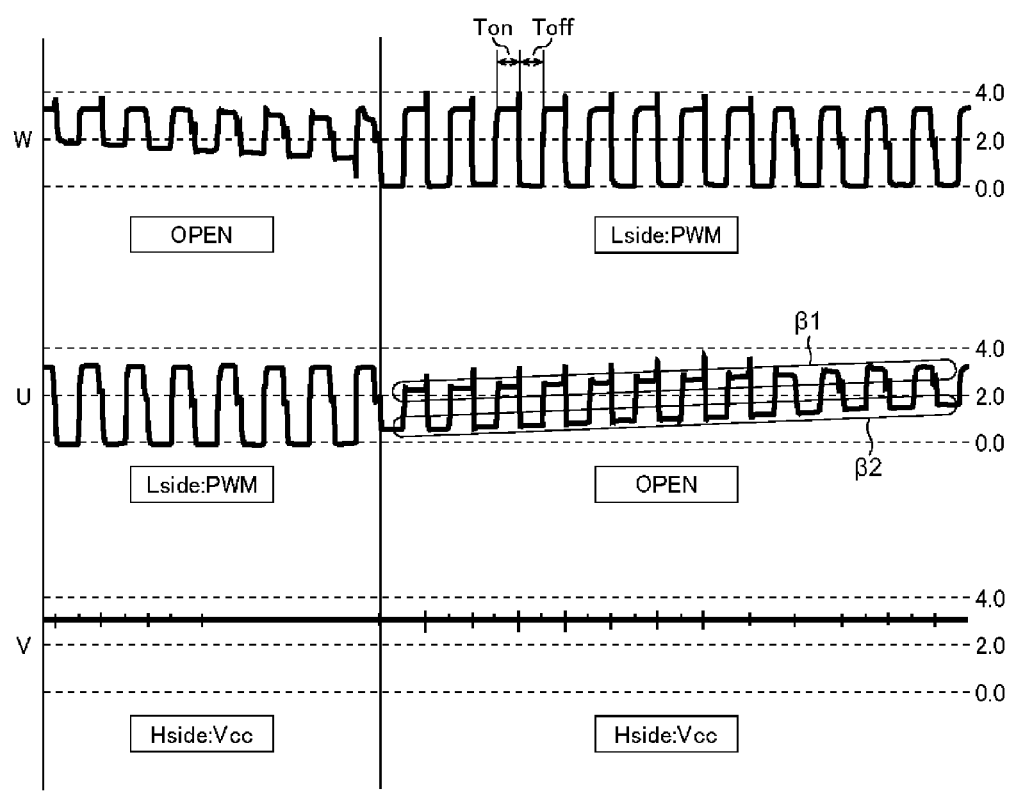
FIG. 17 is a waveform diagram illustrating output voltages in the lower side PWM drive.

FIG. 17 is a waveform diagram illustrating the output voltages U, V, and W in the lower side PWM drive (with a PWM duty of 50%). In the PWM on period Ton of the lower side switch (e.g. the W-phase lower side switch), an induced voltage appears as the output voltage of the non-drive phase (e.g. the U-phase output voltage U) at or near the middle point between the power supply voltage Vcc and the ground voltage GND (see an area 131 in this diagram). Therefore, there is no particular problem in the signal processing by the AD converter 120.

In addition, in the PWM off period Toff of the lower side switch (e.g. the W-phase lower side switch), the output voltage of the non-drive phase (e.g. the U-phase output voltage U) has a positive potential that varies with respect to a high level phase voltage value (fixed to Vcc) as the reference value (see an area α2 in this diagram).

In other words, in the lower side PWM drive, the output voltage of the non-drive phase in the PWM off period Toff may have a potential higher than the power supply voltage Vcc, but does not have a negative potential. Therefore, unlike the upper side PWM drive described above, it is not necessary to add the offset unit 400 as means for eliminating the lower limit saturation of the AD converter 120.

In addition, the motor driving device 10 is already provided with the adjusting unit 300 that generates the feedback voltages Uin, Vin, and Win from the output voltages U, V, and W as means for eliminating upper limit saturation of the AD converter 120. Therefore, it is very easy to adjust the feedback voltages Uin, Vin, and Win to be within the input range of the AD converter 120, by appropriately setting an adjusting ratio (i.e. a dividing ratio) of the adjusting unit 300, in consideration that the output voltage of the non-drive phase in the PWM off period Toff has a potential higher than the power supply voltage Vcc.

From the above description, when performing the sampling timing switching control of the AD converter 120, it is desired to adopt the lower side PWM drive in which it is easy to correctly detect the zero-crossing both in the PWM on period Ton and in the PWM off period Toff.

Note that the fact that the sampling timings of the AD converter 120 can be set to the PWM off period Toff without using the offset unit 400 by PWM driving the lower side switches 204, 205, and 206 can be considered separately from the structure in which the switching control of the sampling timing is performed in accordance with the PWM duty.

For example, in an application in which there is no particular problem even if the sampling timings of the AD converter 120 are always and consistently set to the PWM off period Toff (such as an application having a low variable upper limit value of the PWM duty), it is possible to PWM drive the lower side switches 204, 205, and 206, and to set the sampling timing of the AD converter 120 in the PWM off period Toff in a fixed manner.

<Vehicle>

Figure 18:
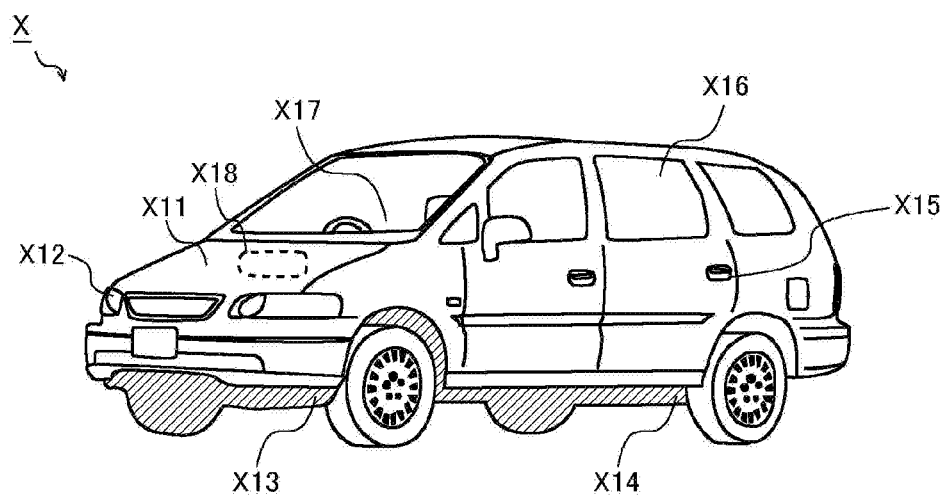
FIG. 18 is an external view illustrating a structural example of a vehicle.

FIG. 18 is an external view illustrating a structural example of a vehicle. A vehicle X of this structural example is equipped with various electronic apparatuses X11 to X18 that operate with the power supply voltage Vcc supplied from a battery (not shown). Note that mounting positions of the electronic apparatuses X11 to X18 in FIG. 18 may be different from actual positions for convenience sake of illustration.

The electronic apparatus X11 is an engine control unit that performs control concerning an engine (such as injection control, electronic throttle control, idling control, oxygen sensor heater control, and automatic cruise control).

The electronic apparatus X12 is a lamp control unit that controls on and off of a high intensity discharged (HID) lamp, a daytime running lamp (DRL), and the like.

The electronic apparatus X13 is a transmission control unit that perform control concerning a transmission.

The electronic apparatus X14 is a brake unit that performs motion control of the vehicle X (such as anti-lock brake system (ABS) control, electric power steering (EPS) control, and electronic suspension control).

The electronic apparatus X15 is a security control unit that performs drive control of a door lock, an anti-theft alarm, and the like.

The electronic apparatus X16 is an electronic apparatus such as a wiper, an electric door mirror, a power window, a damper (shock absorber), an electric sunroof, and an electric seat, which are mounted in the vehicle X as standard equipment or factory options at the shipping stage.

The electronic apparatus X17 is an electronic apparatus such as an in-vehicle audio/visual (A/V) apparatus, a car navigation system, and an electronic toll collection system (ETC), which are arbitrarily mounted in the vehicle X as user options.

The electronic apparatus X18 is an electronic apparatus including a high voltage motor such as an in-vehicle blower, an oil pump, a water pump, and a battery cooling fan.

Note that the electronic apparatuses X11 to X18 are examples of the electronic apparatus 1 described above, and the motor driving device 10 and the motor 20 can be incorporated in any of the electronic apparatuses X11 to X18.

<Other Variations>

Note that various technical features disclosed in this specification can be variously modified, other than the embodiment described above, within the scope not deviating from the spirit of the technical invention.

For example, the embodiment described above exemplifies the structure in which the sequential sampling timings of the AD converter are switched in accordance with the PWM duty, but the application of the present invention is not limited to this. If a plurality of AD converters are used for simultaneous sampling of the feedback voltages, it is possible to adopt a structure in which the simultaneous sampling timings of the AD converters are switched in accordance with the PWM duty.

In addition, the embodiment described above exemplifies the structure in which the sampling timings of the AD converter are switched to one of the PWM on period and the PWM off period in accordance with the PWM duty, but the present invention is not limited to this structure. For example, it is possible to adopt a structure in which the AD converter performs the AD conversion process of the feedback voltage both in the PWM on period and in the PWM off period, and the zero-crossing detection unit uses one of AD conversion results in accordance with the PWM duty.

In this way, the embodiment described above is merely an example in every aspect and should not be interpreted as a limitation. The technical scope of the present invention is defined not by the above description of the embodiment but by the claims, and should be understood to include all modifications within meanings and scopes equivalent to the claims.

INDUSTRIAL APPLICABILITY

The motor control device disclosed in this specification can be appropriately used in applications (such as a fan and a compressor), in which it is necessary to widely change rotational speed of a motor from low speed to high speed, for example.

What is claimed is:

1. A motor control device comprising:
an energization control unit arranged to generate energization control signals of phases of a bridge driver;
an AD converter arranged to sample and convert analog feedback voltages corresponding to output voltages of the phases of the bridge driver into digital feedback signals; and
zero-crossing detection unit arranged to receive an input of the digital feedback signals and to perform zero-crossing detection for determining commutation timing and PWM duty of the energization control signal, wherein sampling timings of the AD converter are switched to one of a PWM on period and a PWM off period according to the PWM duty wherein
the energization control unit includes a counter arranged to count the number of pulses in the clock signal so as to output a count value, and a comparator arranged to compare a duty set value for setting the PWM duty with the count value so as to generate a PWM signal for PWM-driving the energization control signal, and
the sampling timing of the AD converter is determined by matching determination process between a trigger set value corresponding to the duty set value and the count value.

2. The motor control device according to claim 1, wherein the sampling timings of the AD converter are set to the PWM on period when the PWM duty is higher than a threshold duty, and are set to the PWM off period when the PWM duty is lower than the threshold duty.

3. The motor control device according to claim 2, wherein the threshold duty has hysteresis characteristics.

4. The motor control device according to claim 1, wherein the zero-crossing detection unit compares average digital feedback signals of all the phases with the digital feedback signals of a non-drive phase so as to perform the zero-crossing detection.

5. The motor control device according to claim 1, wherein the energization control unit PWM-drives lower side switches of the phases of the bridge driver.

6. The motor control device according to claim 5, wherein the analog feedback voltages are adjusted to be within an input range of the AD converter.

7. The motor control device according to claim 1, wherein the energization control unit PWM-drives upper side switches of the phases of the bridge driver.

8. The motor control device according to claim 7, wherein the analog feedback voltages are adjusted to be within an input range of the AD converter.

9. The motor control device according to claim 1, further comprising an advance angle control unit arranged to perform advance angle control of the commutation timing in accordance with timing information obtained by the zero-crossing detection unit.

10. The motor control device according to claim 1, further comprising a PI control unit arranged to perform PI control of the PWM duty in accordance with speed information obtained by the zero-crossing detection unit.

11. The motor control device according to claim 1, wherein the counter is an up/down counter arranged to repeat increment and decrement of the count value between a predetermined maximum value and a minimum value, and the trigger set value is switched to one of the maximum value and the minimum value in accordance with the duty set value.

12. The motor control device according to claim 1, wherein the energization control unit performs one of 120-degree energization control, 150 degrees energization control, and 180 degrees energization control.

13. The motor control device according to claim 1,
wherein the AD converter performs an AD conversion process of the analog feedback voltages both in the PWM on period and in the PWM off period; and
the zero-crossing detection unit adopts one of AD conversion results in accordance with the PWM duty.

14. A motor driving device comprising:
the motor control device according to claim 1; and
a bridge driver arranged to generate output voltages of the phases in accordance with the energization control signals of the phases input from the motor control device.

15. An electronic apparatus comprising:
a motor; and
the motor driving device according to claim 14 arranged to drive the motor without a sensor.

16. The electronic apparatus according to claim 15, wherein the motor is a three-phase brushless DC motor.

17. A vehicle comprising:
a battery; and
the electronic apparatus according to claim 16 arranged to operate with a power supply voltage supplied from the battery.

* * * * *